I. SUTHERLAND.
CINEMATOGRAPHY.
APPLICATION FILED MAR. 12, 1920.
1,364,652.
Patented Jan. 4, 1921.
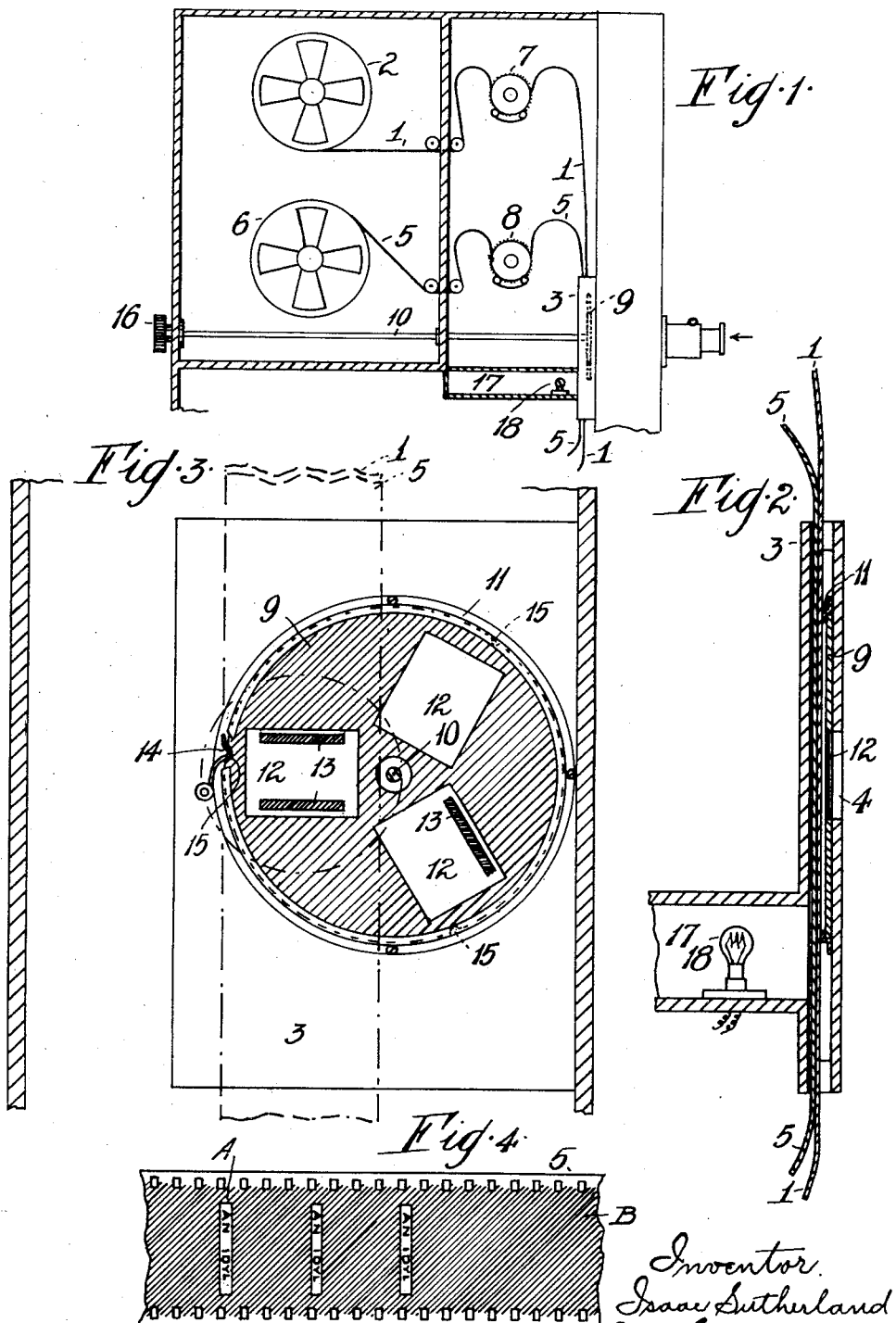

UNITED STATES PATENT OFFICE.

ISAAC SUTHERLAND, OF MELBOURNE, VICTORIA, AUSTRALIA.

CINEMATOGRAPHY.

1,364,652.   Specification of Letters Patent.   Patented Jan. 4, 1921.

Application filed March 12, 1920. Serial No. 365,237.

*To all whom it may concern:*

Be it known that I, ISAAC SUTHERLAND, a subject of the King of Great Britain, of "Normanhurst," Collins Place, Melbourne, in the State of Victoria, Commonwealth of Australia, have invented certain new and useful Improvements Relating to Cinematography, of which the following is a specification.

This invention relates to the art of cinematography and aims at an improved method of achieving a projection result in which presentation upon the screen is effected, simultaneously with the pictures, of reading matter, as for instance, titles, sub-titles, dialogue cast or other desirable explanatory matter.

At the present time the projection of such matter is usually effected separately, and in a photo-play production it has been estimated to the applicant that from ten to twenty per cent. of the film length is absorbed in the provision of this separate display of explanatory reading matter.

Consequent upon this absorption of film it is usual to restrict the display of dialogue in order to reduce film production costs.

Broadly stated the present invention consists essentially in the provision of means whereby a portion of the negative film during each camera exposure is protected against exposure, and the portion on a positive film registering therewith during production of the latter is exposed to a negative of the reading matter.

In a practical manner this provision can be effected by the combination in the camera with the sensitized negative film of a transparent masking material having one portion or strip colored to prevent passage of objective rays from the lens to the negative.

The exposed negative film is then masked to protect the previously exposed portions and to expose the before-mentioned strip portion to the reading matter. The subsequent development produces a negative having a picture and reading matter combined thereon and from the positive produced therefrom a simultaneous projection of picture and reading matter is effected.

Alternatively as the negative when developed will have a clear space at the masked portion, when printing a positive film therefrom a negative of the reading matter is interposed between the clear space on the negative and the positive film.

The accompanying drawings illustrate the invention as applied to cinematograph camera—

Figure 1 being an interior view of portion of the camera.

Fig. 2 an enlarged vertical section through the gate of the camera and

Fig. 3 an elevation of the mask.

Fig. 4 is a fragmentary view of a strip of the positive film.

Referring to these drawings the unexposed negative film 1 is drawn off reel 2 and fed down by a pinion 7 through the gate casing 3 past the exposure opening 4 in line with the lens of the camera in the usual way.

Similarly the positive film 5 bearing titles and the like is drawn off an additional reel 6 and fed down by a pinion 8 through the gate at the rear of the positive film and in contact therewith.

Immediately behind the opening 4 and in front of the negative film is located an adjustable mask 9 which may be in the form of a rotatable disk mounted on a spindle 10 and engaging at its edge with a grooved circular guide 11. This disk mask is provided with the required number of transparent panels 12 all of which except one bear masking portions 13 where required.

Means are provided for retaining one or the other of the panels 12 opposite the opening 4 of the gate casing and as illustrated a spring catch 14 engages with one or other of a series of notches 15 formed in the edge of the disk. Suitable means are also provided for conveniently rotating the disk, as for instance by extending the axial spindle through a light tight opening in the rear of the camera and terminating same with a milled disk 16.

At a suitable distance below the opening 4 there is provided a compartment 17, at the rear of the films, which contains an electrically lighted lamp 18 controlled by a suitable switch (not illustrated). The end of said compartment is open to direct the rays of light against the back of the positive film.

This positive film is made opaque except where the letter press panels are printed thereon. If black printing is required on the negative film transparent letters are printed on the positive film, but where white lettering is required the transparent strips are formed with black printing thereon as shown at A in Fig. 4.

If the positive film according to the preferred arrangement is the same length as the negative film and it is not required to have letter press on certain portions of the negative film the corresponding portion of the positive film is dense black as shown at B in Fig. 4.

Alternatively a shorter positive film may be used only containing the letter press in which case it is caused to travel through the gate casing when the corresponding portion of the negative film is passing through same.

The positive film is previously prepared with the required letter press before the images are photographed and it and the negative film are fed simultaneously through the gate. When, for instance, a title such as "An Idyl" is required to be printed at the top of the negative, the mask disk is rotated till the panel with the masking strip at the top is opposite the gate opening so that as the negative film passes said opening, blank strips will be left unexposed above the images.

As said blanks come opposite the open end of the lamp compartment the positive film bearing the printed title is immediately behind the same so that the lamp light passing through the positive film prints the title on the blank transparent strip on the negative film.

The two films are rewound in the usual manner each on a separate reel, not illustrated, provided in the camera.

Although the photographing of the titles and the like as well as of the acting is effected in a camera as above described, it will be evident that the scenes may be first photographed in conjunction with the mask and the negative film before development subsequently caused to travel in unison with the positive letter press film past a lamp box as above described or after negative development and during the printing of a positive film to be used in a projecting machine, the film containing the titles or the like interposed between the developed negative and the said positive.

I claim:—

1. Improvements in cinematograph apparatus comprising a cinematograph camera, an adjustable mask mounted at the rear of the gate opening of said camera, a positive film bearing letters or matter to be produced on a negative film, means to feed both said films in unison through the gate with the positive film behind said negative film and an open ended compartment below said gate opening containing a lamp.

2. Improvements in cinematograph apparatus comprising a cinematograph camera, a rotatable mask arranged at the rear of the gate opening and provided with transparent panels with masking portions, means to rotate said disk to bring any panel therein opposite the gate opening, a positive film bearing the matter to be produced on said negative film adapted to be wound off on an additional reel in the camera and fed in unison with the negative film behind said mask and an open ended lamp compartment past the open end of which both films are fed.

Dated this 4th day of February A. D. 1920.
ISAAC SUTHERLAND.